United States Patent
Teruggi et al.

(10) Patent No.: US 6,797,073 B1
(45) Date of Patent: Sep. 28, 2004

(54) PLANT FOR WASHING PLASTIC MATERIAL

(75) Inventors: Piergiorgio Teruggi, Fontaneto d'Argogna (IT); Enrico Sereni, Reggio Emilia (IT)

(73) Assignee: Amut S.p.A., Novara (IT)

( * ) Notice: Subject to any disclaimer, the term of this patent is extended or adjusted under 35 U.S.C. 154(b) by 0 days.

(21) Appl. No.: 10/018,376

(22) PCT Filed: Jun. 16, 1999

(86) PCT No.: PCT/IT99/00173

§ 371 (c)(1),
(2), (4) Date: Dec. 13, 2001

(87) PCT Pub. No.: WO00/76681

PCT Pub. Date: Dec. 21, 2000

(51) Int. Cl.⁷ .............................. B08B 3/00; B08B 3/10
(52) U.S. Cl. .............................. 134/18; 134/10; 134/13; 134/25.1; 134/25.5; 134/32; 134/33; 134/34; 134/35; 134/108; 134/111; 134/133
(58) Field of Search .............................. 134/18, 10, 13, 134/25.1, 25.5, 32, 33, 34, 35, 105, 108, 111, 133, 134, 65, 113, 132; 68/24, 58

(56) References Cited

U.S. PATENT DOCUMENTS

| | | | | |
|---|---|---|---|---|
| 4,073,661 A | * | 2/1978 | Buzga et al. | .................. 241/20 |
| 5,083,447 A | * | 1/1992 | Kiuchi et al. | .............. 68/12.05 |
| 5,185,041 A | * | 2/1993 | Anderson et al. | .......... 134/25.1 |

FOREIGN PATENT DOCUMENTS

| | | | |
|---|---|---|---|
| EP | 0 056 437 | * | 7/1982 |
| WO | WO 92/08591 | * | 5/1992 |

OTHER PUBLICATIONS

Patent Abstracts of Japan, vol. 006, No. 267, Dec. 25, 1982, & JP 57 159612 A (Yoshino Kogyosho: KK), Oct. 01, 1982.*

* cited by examiner

*Primary Examiner*—Zeinab El-Arini
(74) *Attorney, Agent, or Firm*—Medlen & Carroll, LLP

(57) ABSTRACT

A plant for the continuous washing of plastic material in scales. The plant having a washing apparatus, at least one filtering unit connected to the apparatus for purifying the washing fluid and means for varying the time the scales remain in the washing apparatus as a function of the quantity of scales contained at that same moment in the same apparatus.

21 Claims, 1 Drawing Sheet

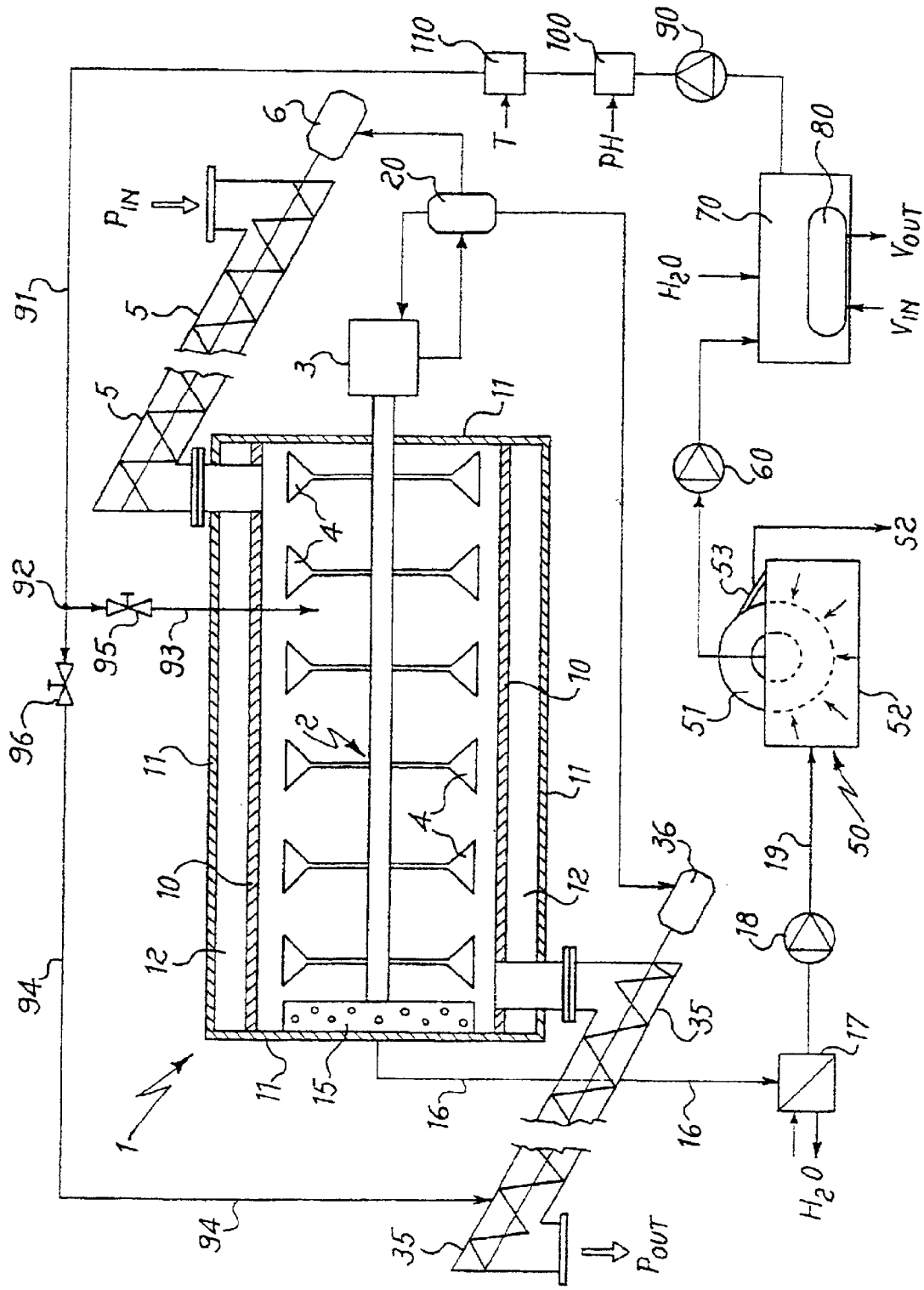

US 6,797,073 B1

PLANT FOR WASHING PLASTIC MATERIAL

This is a national stage application of PCT/IT99/00173 filed Jun. 16, 1999.

FIELD OF THE INVENTION

The present invention relates to a plant for washing plastic material in scales, in particular a plant of the type destined to be inserted in a line for the treatment of recyclable plastic materials.

STATE OF THE ART

The products in plastic material containing one or more recyclable parts are conveyed to the recycling plants and subjected to different treatments to separate the recyclable parts and make them fit for subsequent reuse.

A particular example of recyclable plastic material is the polyethylene terephthalate (PET) of which the bottles containing mineral waters, drinks or similar are generally made.

In order to effectively obtain recyclable PET from these bottles, all those parts joined to the bottle but made with other materials, for instance the labels in paper or plastic, the glue used to stick them to the bottle, as well as the stopper and the base of the bottle, generally made of polyolefin or similar, must be eliminated.

The processes till now proposed in the known technique, comprising different phases of washing and separation of the materials, haven't given satisfactory results till now because both the purity of the recyclable material so obtained and the costs necessary to get a product of high purity. These drawbacks are mainly due to the need to reconcile two clearly conflicting demands.

On one hand, the washing treatment must be sufficiently energetic and extended in time to allow the separation of the glue fixing the labels. Furthermore, the continuous removal of the glue and the residues of labels from the washing fluid must be guaranteed.

On the other, the costs necessary to satisfy these requirements are particularly high, because of the considerable quantity of washing fluid necessary to remove the glue, and because of the long time, required by the treatment. Furthermore, it must be remembered that it is necessary bring the glue to the melting temperature, to allow the same to melt and to mix with the washing fluid. That requires a high waste of energy, and therefore causes very high costs, if it is desired to obtain recyclable PET of high purity.

PURPOSE OF THE INVENTION

The purpose of the present invention is therefore to propose a plant for washing recyclable plastic material in a continuous way that allows the washing of the plastic material, preferably reduced to scales, to be effected in a particular efficient way.

Another purpose of the present invention is to propose a plant of the type specified above, that allows the washing of recyclable plastic material to be effected with particular limited costs.

A further purpose of the present invention is to propose a method for washing the recyclable plastic material in a continuous way that allows recyclable plastic material of high purity to be obtained.

SUMMARY OF THE INVENTION

These purposes are achieved by the present invention, which relates to a plant for the continuous washing of plastic material in scales, of the type comprising a washing apparatus equipped with at least one rotating stirrer and containing a washing fluid, at least one filtering unit connected to the apparatus for purifying the washing fluid, a device for feeding the scales to the washing apparatus, a device for withdrawing the scales from the washing apparatus and a plurality of conduits for connecting the washing apparatus and the filtering unit in fluid communication with a circuit in which the washing fluid flows, characterised by comprising means for varying the time in which the scales remain in the washing apparatus as a function of the quantity of scales contained at that same moment in the apparatus.

In this way it is possible to hold the scales in the washing apparatus only for the time necessary to remove all the glue from the scales, thus allowing a considerable limitation of the washing fluid employed during the treatment. The washing fluid is constituted for instance by an aqueous solution maintained at a sufficiently high temperature to melt the glue present on the scales.

The means for varying the time in which the scales remain in the washing apparatus comprise at least a first control device that receives in input a data item representative of the current drawn by is the motor driving the stirrer and controls the operation of the motors connected to the device for feeding the scales and the device for withdrawing the scales respectively. The devices for feeding and withdrawing the scales could be constituted for instance by tilted screw conveyors operated by respective electric motors.

A second control device allows the speed of rotation of the stirrer to be varied as a function of the quantity of scales present at that same moment in the apparatus. That allows advantageously to adapt the frictional action between the scales imparted by the stirrer as a function of their quantity present at a certain instant in the apparatus.

According to a preferential embodiment of the present invention, the washing apparatus is constituted by a closed container that is surrounded by a heat-insulating shell to form a gap between the inside wall of the shell and the external wall of the container.

A heating fluid, for instance high temperature steam, is advantageously introduced into the gap to maintain the inside the apparatus at a constant temperature sufficient to cause the melting of the glue on the scales subjected to treatment and prevent the same glue from solidifying and being deposited again on the scales.

The washing fluid withdrawn from the apparatus is conducted to a filtering unit in which is separated, not only the papery residues still present, but also the glue which is deposited on a fine-pore filtering element. The latter is preferably constituted by a fossil meal filter from which the layer of glue that sticks there is continually removed. The washing fluid as purified is reintroduced by means of a conduit of readmission which carries at least a fraction of the purified washing fluid to the device for withdrawing the scales from the washing apparatus. The purified fluid coming out from the filtering unit, which is undoubtedly cleaner than the washing fluid dragged together with the scales leaving the washing apparatus, is advantageously used to rinse the scales before these go on to a subsequent stage. That makes it possible therefore to bring impurities still present on the scales back into the apparatus again. This not only reduces the quantity of washing fluid employed, but also improves the purity of the material leaving the apparatus.

There is preferably a heat-exchanger provided along the readmission conduit that permits the fluid to be brought up to the desired temperature again before the reintroduction in the washing apparatus, as well as one or more stations to monitor and, if necessary, correct the pH and the composition of the reintroduced fluid.

The invention further concerns a method for washing plastic material in scales, of the type providing the feeding and the withdrawing in a continuous way of scales in a washing apparatus equipped with at least one rotating stirrer and containing a washing fluid, characterised by providing for the regulation of the time the scales remain in the apparatus as a function of the quantity of scales contained at that same moment in the same apparatus.

A particularly advantageous aspect of the method according to the invention consists in maintaining a quantity of washing fluid in the washing apparatus that is proportional to the quantity of scales present at that some moment in the apparatus. This allows that only a quantity of fluid effectively necessary to each instant of the washing phase be used, thus allowing to further limit the consumption of the washing fluid employed.

Furthermore, the method according to the invention, provides the regulation of the speed of rotation of the stirrer as a function of the quantity of scales contained at that same moment in said apparatus, thus allowing the frictional action between the scales to be varied as a function of the actual quantity of scales subjected to washing in any determined instant.

BRIEF DESCRIPTION OF THE DRAWINGS

Further advantages and characteristics of the present invention will be more evident from the description that follows, made by way of example and with not limiting purpose, with particular reference to the attached drawing, in which a schematic view of a plant according to the present invention is illustrated.

MODES FOR CARRYING OUT THE INVENTION

The figure represents a plant for the continuous washing of plastic material in scales and, in particular, of scales made of recyclable PET. The plant in particular comprises a washing apparatus 1 equipped with an stirrer 2 set in rotation by an electric motor 3, with a plurality of vanes 4 that impart an action of agitation to both a washing fluid, consisting preferably of an aqueous solution, and the scales of plastic material present in the apparatus 1.

The plastic material in scales arrives at the apparatus 1, represented symbolically by the $P_{IN}$ arrow, and is introduced into the washing apparatus 1 by means of a tilted screw conveyor 5 driven by an electric motor 6. The scales introduced into the apparatus 1 generally transport also a small fraction of a fluid, also consisting of an aqueous solution used in upstream processing stages, for is instance a floatation bath to separate PET (heavier than water) from polyolefin or similar (lighter than water).

Inside the washing apparatus 1 the scales are subjected to the action of agitation imparted by the stirrer 2 in the presence of the washing fluid maintained at a constant temperature preset in the interval between 85° C. and 100° C., preferably around 95° C. The stirrer energetic action causes mutual friction between the scales and the simultaneous action of the washing fluid at preset temperature causes the glue to separate from the scales and become suspended in the washing fluid.

To prevent the glue solidifying again and being redeposited on the same scales, it is particularly important to maintain a constant temperature inside the apparatus. For this reason, the washing apparatus 1 is made of a closed container 10 completely surrounded by a covering of heat-insulating shell 11. Between the external wall of the container 10 and the inside wall of the shell 11 there is a gap 12 in which high-temperature steam is caused to circulate in order to maintain substantially constant the temperature inside the washing apparatus 1.

The flow of scales inside the washing apparatus 1, and therefore the time they remain in the apparatus, is controlled on the basis of the quantity of scales present at that same moment in the washing apparatus. That is done by measuring the instantaneous current drawn by the motor 3 driving the stirrer 2. The signal representative of this parameter is sent to a control unit 20 that consequently controls the motor 6 of the screw conveyor 5 introducing the scales and the motor 36 of the screw conveyor 35 withdrawing the scales. Inverter devices are connected to both the electric motors 6 and 36 respectively which allow the speed of the screw conveyors to be regulated.

A further control is effected on the rotation speed of the motor 3, and therefore on the stirring action inside the washing apparatus 1, always as a function of the quantity of scales present at that same moment in the apparatus 1. This control could be effected by the same unit 20, as represented in the figure or, if necessary, by a separate control unit that acts on an inverter device connected to the electric motor 3.

These controls allow the parameters that determine effective washing of the scales, i.e. the stay time and the amount of agitation, to be adapted advantageously on the basis of the quantity of scales present in the apparatus in any determined instant. With continuous washing, the quality of the product output by the plant according to the present invention can be maintained constant.

It is important to point out that the quantity of washing fluid present in the washing apparatus 1 during normal operation is always maintained substantially proportional to the quantity of scales present at that some moment in the apparatus. That is achieved by regulating the quantity of washing fluid that is readmitted to the apparatus as a function of the quantity of fluid expelled from the filtering unit 50 that is described below in more detail.

The scales leaving the apparatus (indicated schematically by the $P_{OUT}$ arrow) are withdrawn by the screw conveyor 35 at the extremity opposite that of introduction and are sent to the next processing stage, for instance a scale rinsing and/or drying and/or desiccation stage. There is a perforated grate 15 provided in correspondence with the collecting extremity that allows the collection of the washing fluid to be purified and sends it to a particular filtering unit 50 that allows the removal of the glue from the washing fluid.

The washing fluid removed from the apparatus 1 is sent by means of a conduit 16 to a heat exchanger 17 that provides for the lowering of the temperature of the fluid by means of circulation of cooling water. A pump 18 located along a conduit 19 allows to transfer the washing fluid from the heat exchanger 17 to the filtering unit 50. The latter comprises a filtering element 51, of the fine-pore type, partially immersed in a bath 52. The filtering element 51 comprises preferably a drum made of fossil meal on which is continually deposited, and from which is continually removed, the glue mixed with the washing fluid.

Since the temperature of the fluid in the filtering unit 50 is lower than the melting point of the glue, the latter is deposited on the external surface of the filtering element 51 and is continually removed, if necessary together with a thin layer of the filtering element 51, by a blade 53 and expelled trough a waste S2.

The washing fluid thus purified is regenerated in its essential characteristics before being reintroduced into the washing apparatus 1. In particular, the fluid is withdrawn from the filtering unit 50 by means of a pump 60 and sent toward a reservoir 70, in which a heat exchanger 80 raises the temperature by means of steam ($V_{IN}$ arrows and $V_{OUT}$). Fresh water (arrow $H_2O$) is introduced into the reservoir 70 to compensate the loss of fluid in the filtering unit 50 and to make up the circulating volume.

The fluid driven by a pump 90 is restored in a control station 100 by a possible correction of the pH by means of admission of suitable additives (PH arrow), as well as in a control station 110 in correspondence of which suitable chemical additives (T arrow) such as surfactants or similar substances, for instance, are added.

A conduit 91 then carries the fluid toward a junction 92 from which one conduit 93 brings the purified fluid again directly into the washing apparatus 1. A part of the purified fluid is advantageously conveyed in another conduit 94, also connected to the junction 92, and introduced in the screw conveyor 35 to carry out an effective rinsing of the scales in counter-current. Both the conduits 93 and 94 are preferably equipped with respective valves 95 and 96 to allow the independent regulation of the fractions of liquid reintroduced into the apparatus 1 and in the screw conveyor 35.

Preferably, the quantity of washing fluid of introduced initially into the apparatus is proportional to what is presumed to be the ideal quantity for effective washing. It has been established that, during the normal operation, the quantity of washing fluid present at that same moment in the apparatus 1 tends, however, to stay substantially proportional to the quantity of scales present inside the washing apparatus 1 in the same instant. This is due to the fact that the scales, as much in entry as in exit, carry in each case some fluid adhering to them.

Therefore, the only regulation necessary to maintain the desired optimal proportion between quantity of scales and quantity of the washing fluid is effected by acting simply on the pump 90 and on the admission of fresh water in correspondence of the reservoir 70. That not only allows limiting the quantity of fluid used by the plant, but also means always having optimum conditions inside the apparatus 1 to get effective continuous washing treatment, independently of the variation of flow of scales upstream and/or downstream of the plant according to the present invention.

What is claimed is:

1. A plant for the continuous washing of plastic material in a quantity of scales over a varying time, said plant comprising a washing apparatus equipped with at least one rotating stirrer having a varying rotation speed, and containing a washing fluid, at least one filtering unit connected to said washing apparatus for purifying said washing fluid, a device for feeding scales of plastic material in a continuous way to said washing apparatus, a device for withdrawing said scales of plastic material in a continuous way from said washing apparatus and a plurality of conduits to connect in fluid communication said washing apparatus and said filtering unit with a circuit in which said washing fluid flows, and wherein said plant comprises means for continuously varying the time said scales remain in said washing apparatus as a function of the quantity of scales contained in said washing apparatus.

2. A plant according to claim 1, wherein said rotating stirrer, said device for feeding said scales and said device for withdrawing said scales are operated by respective electric motors, and wherein said electric motor driving said rotating stirrer draws a current.

3. A plant according to claim 2, wherein said means for varying the time said scales remain in said washing apparatus comprises at least one first control device acting to receive as input a data item representative of the current drawn by the motor driving said stirrer and to control the driving of said motors connected respectively to said device for feeding said scales and to said device for withdrawing said scales.

4. A plant according to claim 3, additionally comprising at least one second control unit for varying the speed of rotation of said stirrer as a function of the quantity of scales contained in said washing apparatus.

5. A plant according to claim 1 wherein said washing apparatus comprises a closed container and is surrounded by a heat-insulating covering shell to form a gap between an inside wall of said shell and an external wall of said container.

6. A plant according to claim 5, additionally comprising means for circulating a heating fluid in said gap.

7. A plant according to claim 1 wherein said washing fluid consists of an aqueous solution.

8. A plant according to claim 1 additionally comprising a conduit of readmission that carries at least one fraction of the washing fluid purified by said at least one filtering unit to said device for withdrawing said scales from said washing apparatus, the remaining faction of said fluid being reintroduced directly into said washing apparatus.

9. A plant according to claim 8, additionally comprising at least one heat exchanger device located along said conduit of readmission to control temperature of said washing fluid by means of a heating fluid.

10. A plant according to claim 8, additionally comprising at least one device located along said conduit of readmission for monitoring pH of said washing fluid.

11. A plant according to claim 8, additionally comprising at least one station located along said conduit of readmission for adding one or more chemical products to said washing fluid.

12. A plant according to claim 9, wherein said heating fluid consists of high temperature steam.

13. A plant according to claim 1 wherein said at least one filtering unit comprises at least one fine-pore filtering element.

14. A method for the continuous washing of plastic material in a quantity of scales over a varying time, said method comprising,
   a) providing: i) means for feeding and withdrawing scales of plastic material in a continuous way to a washing apparatus equipped with at least one rotating stirrer having a varying rotation speed, and containing a washing fluid, and, ii) means for continuously varying the time said scales remain in said washing apparatus as a function of the quantity of scales contained in said wading apparatus; and
   b) washing said scales of plastic material over a varying time by acting on the quantity of scales fed to said washing apparatus and on the quantity of scales withdrawn from said washing apparatus.

15. A method according to claim 14, further comprising varying the speed of rotation of said stirrer as a function of the quantity of scales contained in said washing apparatus.

16. A method according to claim 14, characterized in that said washing apparatus comprises a substantially closed container in which said washing fluid and said scales are maintained at a substantially constant temperature by means of a heating fluid that circulates in contact with an external surface of said container.

17. A method according to claim 14, further comprising purifying said washing fluid by means of a filtering unit comprising at least one fine-pore filtering element.

18. A method according to claim 14, further comprising controlling temperature of said washing fluid leaving said filtering unit before its readmission into said washing apparatus.

19. A method according to claim 14, further comprising controlling pH of said washing fluid and the by addition of chemical mixtures to said washing fluid leaving said filtering unit before its readmission into said washing apparatus.

20. A method according to claim 14, further comprising readmitting at least one fraction of said washing fluid in counter-current with respect to flow of said scales in said device for withdrawing said scales from said washing apparatus.

21. A method according to claim 14, characterized by maintaining a quantity of said washing fluid in said washing apparatus that is proportional to the quantity of scales present in said washing apparatus.

* * * * *